(12) United States Patent
Henrichsen et al.

(10) Patent No.: US 12,709,073 B2
(45) Date of Patent: Aug. 18, 2026

(54) METHOD FOR MANUFACTURING A WIND TURBINE BLADE AND FIXTURE FOR MANUFACTURING A WIND TURBINE BLADE

(71) Applicant: Siemens Gamesa Renewable Energy A/S, Brande (DK)

(72) Inventors: Soeren Randrup Daugaard Henrichsen, Vodskov (DK); Allan Hurup, Nibe (DK); Jens Grandjean Joergensen, Aalborg (DK); Mogens Nielsen, Aalborg (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 99 days.

(21) Appl. No.: 17/922,941

(22) PCT Filed: Apr. 27, 2021

(86) PCT No.: PCT/EP2021/060998
§ 371 (c)(1),
(2) Date: Nov. 2, 2022

(87) PCT Pub. No.: WO2021/224070
PCT Pub. Date: Nov. 11, 2021

(65) Prior Publication Data

US 2023/0347600 A1 Nov. 2, 2023

(30) Foreign Application Priority Data

May 7, 2020 (EP) .................................... 20173490

(51) Int. Cl.
*B29C 70/44* (2006.01)
*B29C 70/34* (2006.01)
(Continued)

(52) U.S. Cl.
CPC .......... *B29C 70/443* (2013.01); *B29C 70/342* (2013.01); *F03D 1/0677* (2023.08); *B29L 2031/085* (2013.01); *F05B 2230/90* (2013.01)

(58) Field of Classification Search
CPC . B29C 70/443; B29C 70/342; B29C 65/5042; B29C 66/543; B29C 65/5014;
(Continued)

(56) References Cited

U.S. PATENT DOCUMENTS

| | | | |
|---|---|---|---|
| 8,961,143 | B2 | 2/2015 | Kulenkampff et al. |
| 2009/0250847 | A1 | 10/2009 | Burchardt et al. |

(Continued)

FOREIGN PATENT DOCUMENTS

| | | | |
|---|---|---|---|
| CN | 102076485 | A | 5/2011 |
| CN | 101549562 | B | 9/2013 |

(Continued)

OTHER PUBLICATIONS

PCT International Search Report and Written Opinion of International Searching Authority mailed Jul. 6, 2021 corresponding to PCT International Application No. PCT/EP2021/060998 filed Apr. 27, 2021.

*Primary Examiner* — S. Behrooz Ghorishi
(74) *Attorney, Agent, or Firm* — Schmeiser Olsen PLLC

(57) ABSTRACT

A method for manufacturing a wind turbine blade includes the steps of:
a) arranging a first pre-casted blade segment adjacent to a second pre-casted blade segment,
b) arranging a fiber lay-up in a connection region between the first pre-casted blade segment and the second pre-casted blade segment,
c) covering the connection region with a vacuum cover,
d) applying vacuum to a space covered by the vacuum cover, and
(Continued)

e) infusing the connection region with a resin and curing the resin.

Manufacturing the wind turbine blade by connecting pre-casted segments with each other by vacuum-assisted infusion of resin of added fibers and curing the resin simplifies the manufacturing process. This is in particular the case for very large blades.

13 Claims, 9 Drawing Sheets

(51) Int. Cl.
*B29L 31/08* (2006.01)
*F03D 1/06* (2006.01)

(58) Field of Classification Search
CPC . B29C 65/5021; B29C 65/524; B29C 65/544; B29C 65/7802; B29C 65/7847; B29C 66/1142; B29C 66/1162; B29C 66/324; B29C 66/54; B29C 66/61; B29C 66/721; B29C 66/81423; B29C 65/483; F03D 1/0677; F03D 1/0675; B29L 2031/085; F05B 2230/90; Y02E 10/72; Y02P 70/50; B29D 99/0028
See application file for complete search history.

(56) References Cited

U.S. PATENT DOCUMENTS

| | | | |
|---|---|---|---|
| 2011/0142675 | A1 | 6/2011 | Van Der Bos |
| 2011/0142679 | A1 | 6/2011 | Bendel et al. |
| 2012/0107129 | A1 * | 5/2012 | Kulenkampff .......... B29C 66/61 29/889.71 |
| 2014/0119935 | A1 | 5/2014 | Daenekas et al. |
| 2015/0033544 | A1 | 2/2015 | De Waal Malefijt et al. |
| 2016/0318245 | A1 * | 11/2016 | De Waal Malefijt ... B29C 31/00 |
| 2016/0377052 | A1 | 12/2016 | Caruso et al. |
| 2017/0043542 | A1 | 2/2017 | Jensen et al. |
| 2019/0003450 | A1 * | 1/2019 | Provost ..................... F03D 1/04 |

FOREIGN PATENT DOCUMENTS

| | | | |
|---|---|---|---|
| CN | 102374113 | B | 10/2014 |
| CN | 104080592 | A | 10/2014 |
| CN | 103648752 | B | 12/2016 |
| CN | 106286116 | A | 1/2017 |
| CN | 106457614 | A | 2/2017 |
| EP | 1310351 | A1 | 5/2003 |
| EP | 2106900 | A1 | 10/2009 |
| EP | 2809500 | A2 | 12/2014 |
| EP | 3747639 | A1 | 12/2020 |
| EP | 3751133 | A1 | 12/2020 |
| EP | 3804966 | A1 | 4/2021 |
| EP | 4008894 | A1 | 6/2022 |
| WO | 2019212452 | A1 | 11/2019 |

* cited by examiner 1
2
3
4
5
6
7

10
34
10
10
10
9
23
23
10
8
10
31
12
28
28
V
14, 15
28
26
14, 16
27
28
28
25
26
26
26
VI
20
19
18

19
29
28
21
28
29
22

3'
9'
8'
10'
10'
12'
17
L

METHOD FOR MANUFACTURING A WIND TURBINE BLADE AND FIXTURE FOR MANUFACTURING A WIND TURBINE BLADE

CROSS-REFERENCE TO RELATED APPLICATIONS

This application claims priority to PCT Application No. PCT/EP2021/060998, having a filing date of Apr. 27, 2021, which claims priority to EP Application No. 20173490.2, having a filing date of May 7, 2020, the entire contents both of which are hereby incorporated by reference.

FIELD OF TECHNOLOGY

The following relates to a method for manufacturing a wind turbine blade and a fixture for manufacturing a wind turbine blade.

BACKGROUND

Producing more power using a wind turbine under given wind conditions can be achieved by increasing the size of the blades. However, the manufacture of wind turbine blades is becoming increasingly difficult for increasing blade sizes.

Wind turbine blades usually comprise fiber-reinforced material made by infusing a fiber lay-up (e.g., glass fibers) with a resin and curing the resin.

It is known to manufacture blade half shells, such as a pressure-side shell and a suction-side shell, separately and glue the parts to each other. However, the gluing process has many disadvantages. It is, for example, difficult to achieve a sufficient strength and robustness of the glueline.

To avoid glue joints, it is suggested in EP 1 310 351 A1 to manufacture the blade by packing fiber material for the entire blade, or for a lengthwise blade section, in a mold and by infusing resin in a vacuum-assisted manner and curing the resin.

However, with increasing blade sizes and, thus, increasing blade cross-sections a large amount of fiber material needs to be placed in the mold. This is in particular the case in the inboard portion of the blade comprising the blade root section, where the blade cross section is largest. For example, a diameter at the root section may be as large as 4.5 meter or more. Thus, packing the fiber material for the blade becomes a complex, lengthy and costly process with increasing blade sizes.

Furthermore, it becomes difficult to raise the resin to the top of the blade by vacuum-assisted infusion due to the large cross-section. The gravitational force in combination with the density of the resin used for the infusion defines the maximum height the resin can be raised by the use of vacuum alone.

SUMMARY

An aspect relates to provide an improved method for manufacturing a wind turbine blade.

Accordingly, a method for manufacturing a wind turbine blade is proposed. The method comprises the steps:

a) arranging a first pre-casted blade segment adjacent to a second pre-casted blade segment, b) arranging a fiber lay-up in a connection region between the first pre-casted blade segment and the second pre-casted blade segment, c) covering the connection region with a vacuum cover, d) applying vacuum to a space covered by the vacuum cover, and e) infusing the connection region with a resin, and curing the resin.

Manufacturing the wind turbine blade by connecting pre-casted segments with each other by means of vacuum-assisted resin infusion of added fibers in the connection region and curing the resin simplifies the manufacturing process. This is in particular the case for very large blades. For example, a smaller amount of fibers is required for joining the pre-casted blade segments. Thus, the need to arrange a large amount of dry fibers at a large height is avoided.

Furthermore, having the pre-casted segments, the volume the resin has to fill during the vacuum infusion of the added fiber lay-up in the connection region(s) is smaller for the same blade size compared to the case in which no pre-casted segments are used. Further, the path the resin has to travel during the vacuum infusion is shorter for the same blade size. The resin has, for example, to rise to a lower height above a floor level of a manufacturing site. Therefore, it is easier to infuse the fiber lay-up in a resin infusion process with a good quality, even in the case of larger blade sizes.

In addition, by the proposed method a laminate joint is provided connecting the first and second pre-casted blade segments, once cured. Compared to a connection using an adhesive, the laminate joint formed by resin infusion is a lighter and at the same time stronger joint. It is lighter because in the case of an adhesive, the weight of the adhesive is added in the bond line. Further, the strength of the laminate joint formed by vacuum infusion is comparable to the strength of the pristine laminate. In addition, the laminate joint formed by vacuum infusion avoids the problem of glue joints of having a different material in the glue than in the rest of the blade.

Furthermore, having the pre-casted segments allows to quality check and eventually repair them before assembling the entire blade.

The wind turbine blade is part of a rotor of a wind turbine. The wind turbine is an apparatus to convert the wind's kinetic energy into electrical energy. The wind turbine comprises, for example, the rotor having one or more of the blades connected each to a hub, a nacelle including a generator, and a tower holding, at its top end, the nacelle. The tower of the wind turbine may be connected via a transition piece to a foundation of the wind turbine, such as a monopile in the seabed.

The wind turbine blade, e.g., its root section, is, for example, fixedly connected to the hub. The wind turbine blade is, for example, directly bolted to the hub.

Alternatively, the wind turbine blade, e.g., the root section, is rotatably connected to the hub. For example, the wind turbine blade is connected to a pitch bearing of the wind turbine, and the pitch bearing is connected to the hub. The pitch bearing is configured to adjust the angle of attack of the blade according to the wind speed to control the rotational speed of the blade.

Apart from the (cylindrical) root section connected with the hub, the wind turbine blade is formed aerodynamically. The wind turbine blade comprises, for example, the pressure side (upwind side) and the suction side (downwind side). The pressure side and the suction side are connected with each other at a leading edge and a trailing edge. The pressure and suctions sides and the leading and trailing edges define an interior cavity of the wind turbine blade.

The fiber lay-up includes, in particular, glass fibers, carbon fibers, aramid fibers and/or natural fibers.

The fiber lay-up is, for example, a dry fiber lay-up comprising (only) fibers in dry condition, in particular, fibers without a resin. Fibers in dry condition are more flexible compared to fibers casted in resin. Alternatively, the fiber lay-up may also include fibers with resin such as pre-impregnated fibers (prepreg). The fiber lay-up may, for example, be pre-packed or pre-formed. The fiber lay-up may also include a core material such as balsa or wood.

The resin includes, for example, thermosets, thermoplastics, epoxy, polyurethane, vinyl ester and/or polyester.

The resin is, in particular, infused due to the generated vacuum in the space covered by the vacuum cover. The resin is, for example, cured by applying heat.

The vacuum cover is, for example, a flexible vacuum cover. The vacuum cover is, for example, a vacuum bag. The vacuum cover may be, for example, a reusable vacuum bag, e.g., made from silicone. The vacuum cover may also be a flexible mold or a rigid mold.

The first and second pre-casted blade segments are made, for example, from a fiber-reinforced composite.

The first and second pre-casted blade segments are arranged, for example, adjacent to each other such that they abut each other. The first and second pre-casted blade segments are arranged, for example, adjacent to each other such that they overlap each other. The first and second pre-casted blade segments may comprise tapered edge regions overlapping each other in the connection region. Alternatively, the first and second pre-casted blade segments are arranged adjacent to each other such that they do not overlap each other.

According to an embodiment, the first and second pre-casted blade segments are segments of an inboard blade section and/or of a blade root section.

Having the pre-casted segments for forming the inboard blade section and/or the root section is advantageous as these portions of the blade have the largest cross section and require the largest amount of composite material. By manufacturing the inboard blade section and/or the root section using the pre-casted segments the need to arrange a large amount of dry fibers up to a significant height, e.g., up to 5 m above floor level or higher, is avoided. Further, also the need to raise a large volume of resin up to a large height is avoided.

The root section is, for example, connected with the hub of the wind turbine blade. The inboard blade section comprises, for example, the root section. The inboard blade section has, for example, a length of one-tenth, one-fifth, one-fourth and/or one-third of the total length of the blade.

According to a further embodiment, in step a), the first pre-casted blade segment is arranged adjacent to the second pre-casted blade segment in a circumferential direction of the blade and/or the connection region is a line-shaped connection region orientated along a longitudinal direction of the blade.

Assembling the blade from pre-casted blade segments arranged adjacent to each other in a circumferential direction, i.e., from open segments not having a cavity itself, allows an easy manufacture of the pre-casted blade segments. Furthermore, by having the line-shaped connection region orientated along a longitudinal direction of the blade, the resin has to travel only in a horizontal direction during step e) not in a vertical direction. Thus, the connection region can be better wetted with resin avoiding, for example, dry spots. Hence, a stronger laminate joint is achieved between two pre-casted blade segments.

According to a further embodiment, the method comprises, after one of step a) to e), the step of arranging one or more further pre-casted blade segments adjacent to the first pre-casted blade segment, the second pre-casted blade segment and/or a further pre-casted blade segment, and repeating steps b) to e) for a connection region between one of the further pre-casted blade segments and the first pre-casted blade segment, a connection region between one of the further pre-casted blade segments and the second pre-casted blade segment and/or a connection region between one of the further pre-casted blade segments and another one of the further pre-casted blade segments, wherein the first pre-casted blade segment, the second pre-casted blade segment and the one or more further pre-casted blade segments occupy an entire circumference of a lengthwise blade section.

In particular, the first pre-casted blade segment, the second pre-casted blade segment and the one or more further pre-casted blade segments form, once infused in the connection regions with resin and cured, an entire lengthwise blade section.

Thus, an entire lengthwise blade section, such as the entire inboard blade section and/or entire root section, can be manufacture by using the pre-casted blade segments.

The manufacturing process and the inherent properties of the one or more further pre-casted blade segments are the same as that of the first and second pre-casted blade segments.

Step a) to e) may be carried out for each of two segments after carrying out step a) to e) for another two segments and so on. Alternatively, step a) may be carried out for all segments, then step b) may be carried out for all segments, then step c) may be carried out for all segments, then step d) may be carried out for all segments, and then step e) may be carried out for all segments. Further, also another order of applying the steps a) to e) to each of two adjacent segments may be chosen.

According to a further embodiment, step e) is carried out for all connection regions simultaneously.

Thus, all pre-casted blade segments can be joint simultaneously making the manufacturing process faster.

According to a further embodiment, in step a) the first pre-casted blade segment, the second pre-casted blade segment and/or one or more of the further pre-casted blade segments are positioned, fixed in position and/or fixed to each other.

By positioning, in particular, exactly positioning the pre-casted blade segments, the quality of the joints and of the manufactured blade (e.g., of its outside shape) can be improved.

Positioning the pre-casted blade segments may include to control a current position of one, several or all of them, compare it with a respective target position and move it from the respective current position to the respective target position.

According to a further embodiment, in step a) the first pre-casted blade segment, the second pre-casted blade segment and/or one or more of the further pre-casted blade segments are fixed to each other by means of bolts, pins and/or an adhesive such that they are temporarily connected to each other at least in a time interval between step a) and step e).

Thus, the pre-casted segments are in a temporarily stable arrangement until they are joint with each other by resin infusion and curing.

According to a further embodiment, in step a) the first pre-casted blade segment, the second pre-casted blade segment and/or one or more of the further pre-casted blade segments are arranged by using a fixture. In an embodiment, the fixture has one or more actuators for positioning the first, second and/or further pre-casted blade segments. In an embodiment, the one or more actuators are driven by mechanic, hydraulic and/or electromechanics means. In an embodiment, the one or more actuators are controlled wirelessly.

Having the fixture allows to better arrange the pre-casted segments. The fixture is, in particular, substituting a conventionally used mold. The fixture is, in particular, a lightweight structure.

The fixture comprises, for example, a rigid frame. The rigid frame is, for example, a metal frame and/or a steel frame.

The fixture comprises, for example, one or more support means such as one or more plates for being displaced at the pre-casted segments for supporting them and/or moving them. The one or more support means are, for example, connected to the rigid frame by the one or more actuators.

The fixture is configured for supporting the pre-casted blade segments during their arrangement adjacent to each other and during their connection with each other by vacuum-induced resin infusion and curing.

According to a further embodiment, the fixture comprises suction means, and the first pre-casted blade segment, the second pre-casted blade segment and/or one or more of the further pre-casted blade segments are fixed in position by the suction means.

Having the suction means allows to better arrange and support the pre-casted segments.

According to a further embodiment, the first, second and one or more further pre-casted blade segments are segments of an inboard blade section and/or of a blade root section, the method comprises, before, during or after step a), the step of arranging a dry fiber lay-up for an outboard blade section in a mold such that it overlaps in an overlap region with the first pre-casted blade segment, the second pre-casted blade segment and/or one or more of the further pre-casted blade segments, and the dry fiber lay-up in the mold and the overlap region is infused, before, during or after step e), with resin by vacuum infusion and the resin is cured.

Thus, the entire blade can be manufactured in a single process by infusing the dry fiber lay-up in the mold with resin to form, once cured, the outboard blade section, infusing the line-shaped connection regions between the pre-casted blade segments with resin to form, once cured, the inboard blade section, and infusing a circumferential overlap region between the two with resin (i.e. the circumferential overlap region between the dry fiber lay-up in the mold and the pre-casted segments).

According to a further embodiment, in step a), the first pre-casted blade segment, the second pre-casted blade segment and/or one or more of the further pre-casted blade segments for a lower half shell of an inboard blade section or of a blade root section are arranged adjacent to each other in a lower portion of a fixture, before, during or after step a), a dry fiber lay up for a lower half shell of an outboard blade section is arranged in a lower mold such that it overlaps in an overlap region with the first pre-casted blade segment, the second pre-casted blade segment and/or one or more of the further pre-casted blade segments in the lower portion of the fixture, a mold core is arranged on the dry fiber lay-up in the lower mold, in step a), the first pre-casted blade segment, the second pre-casted blade segment and/or one or more of the further pre-casted blade segments for an upper half shell of the inboard blade section are arranged adjacent to each other in an upper portion of the fixture, before, during or after step a), a dry fiber lay up for an upper half shell of the outboard blade section is arranged on the mold core such that it overlaps in an overlap region with the first pre-casted blade segment, the second pre-casted blade segment and/or one or more of the further pre-casted blade segments in the upper portion of the fixture, an upper mold is arranged on the lower mold such that the dry fiber lay up for the upper half shell of the outboard blade section is arranged in the upper mold, and the dry fiber lay-up in the upper and lower molds and the overlap regions are infused, before, during or after step e), with resin by vacuum infusion and the resin is cured.

According to a further embodiment, the method comprises, before step a) the step of pre-manufacturing the first pre-casted blade segment, the second pre-casted blade segment and/or one or more of the further pre-casted blade segments in an open mold by vacuum infusion of a fiber lay-up with resin and curing the resin.

Pre-manufacturing the pre-casted segments in the open mold allows to visually monitor the resin infusion process. For example, it allows to control a uniform distribution of the resin during infusion which is crucial for achieving a sufficient strength of the laminate. Further, the resin has to be raised to a lower height.

The fiber lay-up is, for example, arranged in the mold along a longitudinal direction with respect to the complete blade. The fiber lay-up is, for example, a dry fiber lay-up or a prepreg.

According to a further aspect, a fixture for manufacturing a wind turbine blade is provided. The fixture is configured for arranging a first pre-casted blade segment and a second pre-casted blade segment adjacent to each other and supporting them during their connection with each other by vacuum-induced resin infusion and curing. Further, the fixture comprises:

a rigid frame, actuators, and support means connected to the rigid frame by the actuators, the support means being configured for disposing them at the first and second pre-casted blade segments.

According to an embodiment of the further aspect, the fixture comprises a lower fixture and an upper fixture, the lower fixture being configured for arranging the first, second and/or one or more further pre-casted blade segments for a lower half shell of an inboard blade section or blade root section, and the upper fixture being configured for arranging the first, second and/or one or more further pre-casted blade segments for an upper half shell of the inboard blade section or blade root section.

According to a further embodiment of the further aspect, the fixture comprises suction means for fixing the first pre-casted blade segment, the second pre-casted blade segment and/or one or more of the further pre-casted blade segments in position.

The embodiments and features described with reference to the method of embodiments of the present invention apply mutatis mutandis to the fixture of embodiments of the present invention and vice versa.

Further possible implementations or alternative solutions of embodiments of the invention also encompass combinations—that are not explicitly mentioned herein—of features described above or below with regard to the embodiments. The person skilled in the art may also add individual or isolated aspects and features to the most basic form of embodiments of the invention.

BRIEF DESCRIPTION

Some of the embodiments will be described in detail, with reference to the following figures, wherein like designations denote like members, wherein.

DETAILED DESCRIPTION

Figure 1:
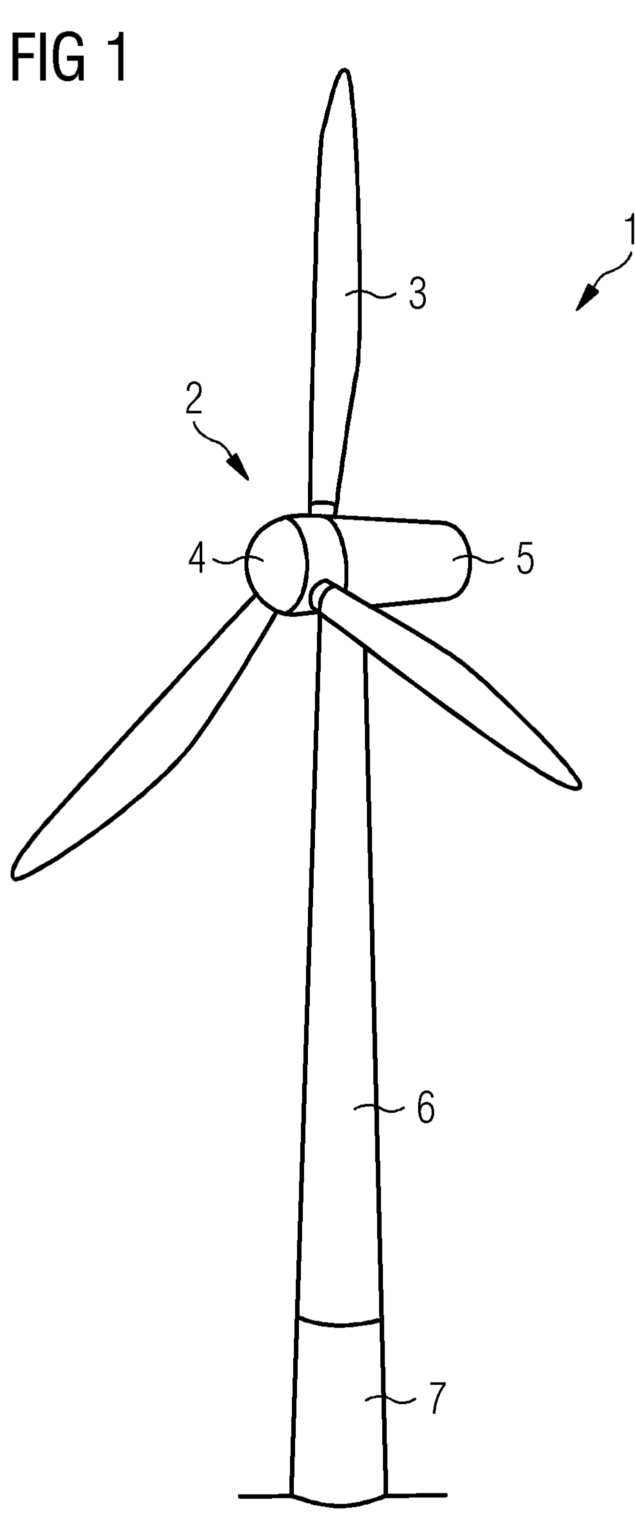
FIG. 1 shows a wind turbine according to an embodiment.

In the Figures, like reference numerals designate like or functionally equivalent elements, unless otherwise indicated.

FIG. 1 shows an offshore wind turbine 1 according to an embodiment.

The wind turbine 1 comprises a rotor 2 having, for example, three rotor blades 3. The rotor blades 3 are connected to a hub 4 of the wind turbine 1. The rotor 2 is connected to a generator (not shown) arranged inside a nacelle 5. The nacelle 5 is arranged at the upper end of a tower 6 of the wind turbine 1. The nacelle 5 is connected to the tower 6, for example by a yaw bearing (not shown) such that the nacelle 5 can rotate relative to the tower 6. The tower 5 is, for example, erected on a monopile 7 driven into the seabed.

The wind turbine 1 converts the wind's kinetic energy into electrical energy. The larger the blades 3, the more electrical energy can be generated under given wind conditions. Manufacturing wind turbine blades of large size from fiber-reinforced material is challenging.

In the following an improved method for manufacturing a wind turbine blade 3 is described with respect to FIGS. 2 to 11.

Figure 2:
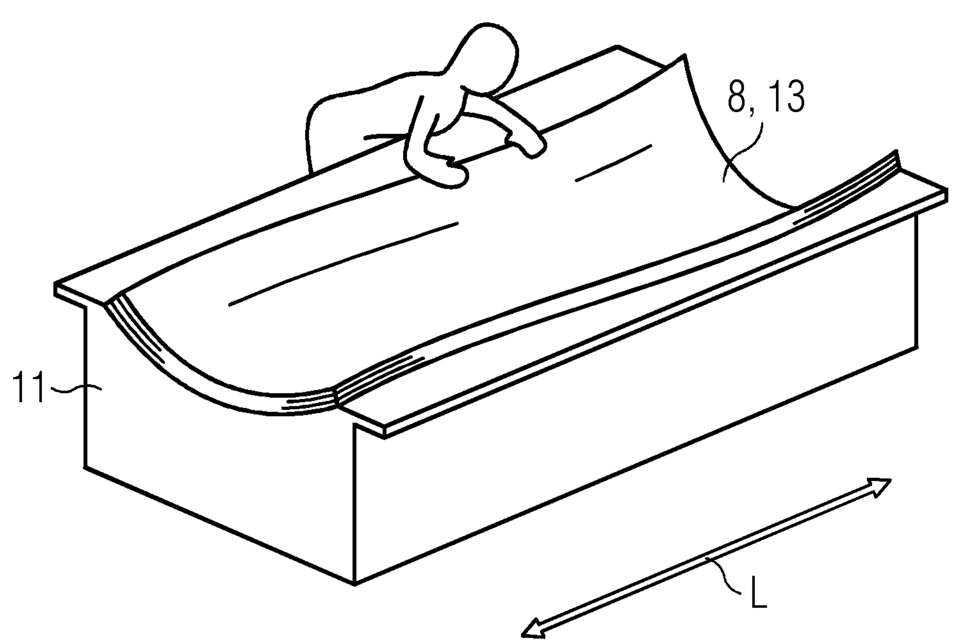
FIG. 2 shows a perspective view of an open mold for pre-manufacturing a segment of an inboard blade section of the wind turbine of FIG. 1.
Figure 3:
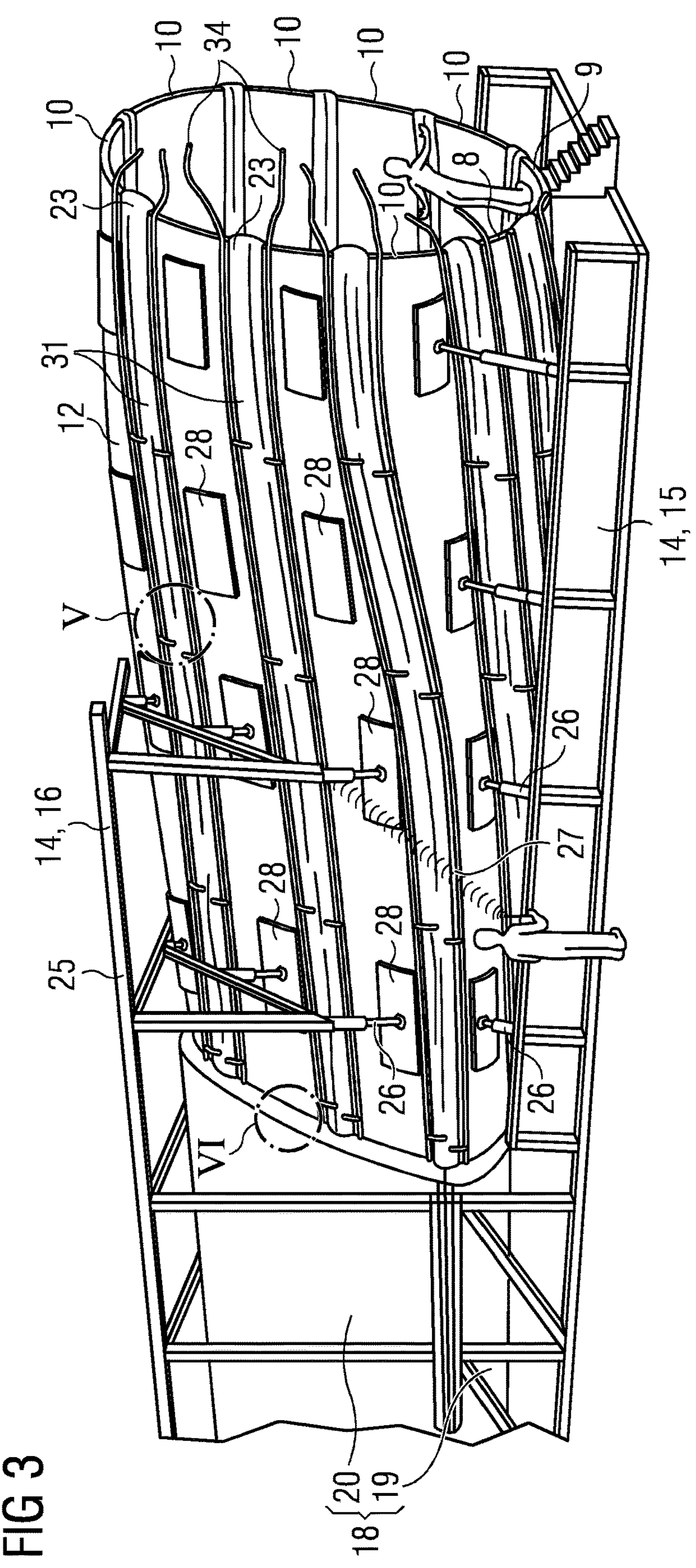
FIG. 3 shows a perspective view of a mold and a fixture for manufacturing a wind turbine blade of the wind turbine of FIG. 1 using pre-casted segments as shown in FIG. 2.

In step S1 of the method, blade segments 8, 9, 10 are pre-manufactured in a small open mold 11. FIG. 2 shows as example a first blade segment 8 in the open mold 11. The blade segments 8, 9, 10 are used to form an inboard blade section 12 (FIG. 3). As shown in FIG. 2, a fiber lay-up 13 is arranged in the open mold 11. The fiber lay-up 13 may be a dry fiber lay-up without any resin or a pre-impregnated fiber lay-up. The fiber lay-up may include a core material such as balsa or wood. The fiber lay-up 13 is, for example, arranged such that elongated fiber plies are arranged in the open mold 11 along a longitudinal direction L with respect to the blade segment 8 and the complete blade 3. The fiber lay-up 13 is covered by a vacuum bag and infused in a vacuum-assisted manner with resin (not shown).

As the mold 11 is open towards the top, the fiber lay-up 13 can be easily arranged in the mold 11. Further, it is possible to visually monitor the resin infusion process. Thus, it can be assured that the resin drawn in by the vacuum is uniformly distributed throughout the fiber lay-up 13. This allows to avoid dry spots in the laminate. Further, as the open mold 11 has a low height, for example a lower height than a closed mold, the resin can be more easily raised to a top portion of the mold 11.

Figure 7:
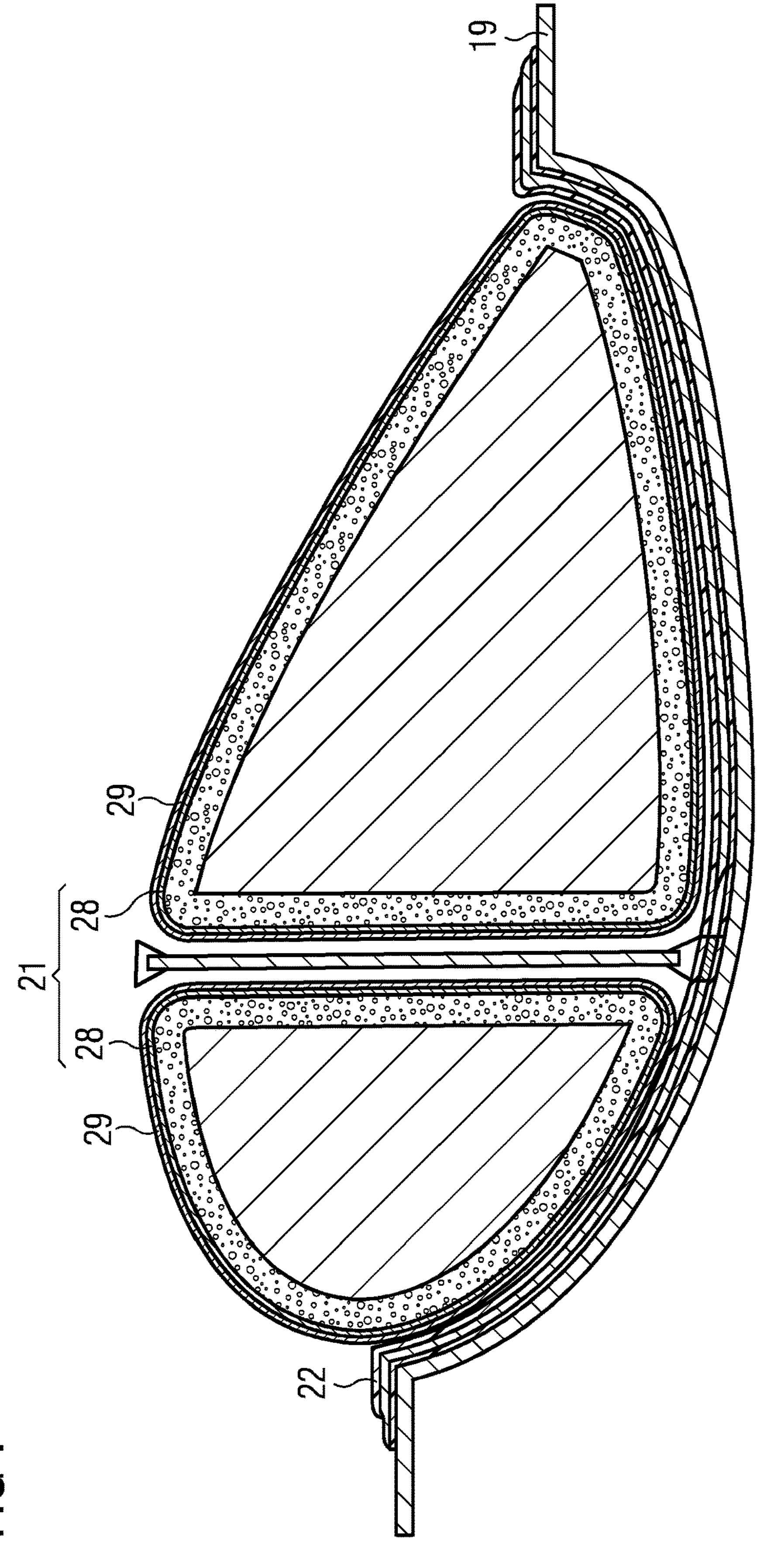
FIG. 7 shows a view similar as FIG. 4 but with a mold core added.

In the following steps of the method, the entire blade 3 is manufactured by using the pre-casted blade segments 8, 9, 10 manufactured in step S1. The pre-casted segments 8, 9, 10 are used to form the inboard blade section 12. For arranging and supporting the pre-casted segments 8, 9, 10 a fixture 14 is used, as shown in FIG. 3. The fixture 14 comprises a lower portion 15 and an upper portion 16. For manufacturing an outboard blade section 17 (FIG. 8) of the blade 3, a mold 18 is used, as shown in FIG. 3. The mold 18 comprises a lower mold 19 and an upper mold 20. Further, the mold 18 comprises a mold core 21 (FIG. 7).

Figure 4:
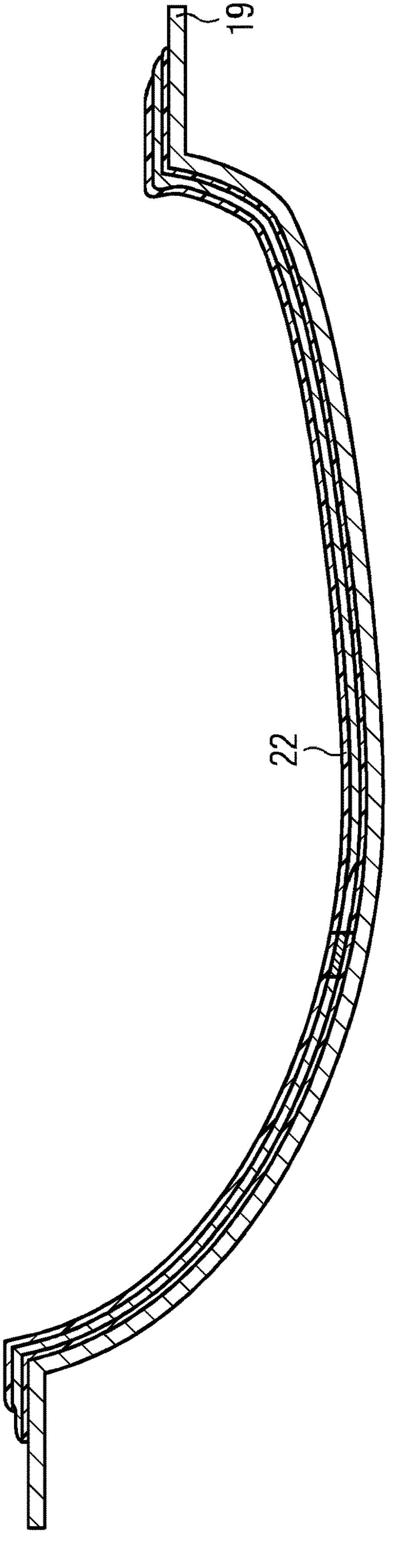
FIG. 4 shows a lower mold of the mold of FIG. 3 with a dry fiber lay-up.

In step S2 of the method, the lower mold 19 is provided, as shown in FIG. 4. Further, a dry fiber lay-up 22 is arranged in the lower mold 19.

In step S3 of the method, the pre-casted blade segments 8, 9, 10 for a lower half shell of the inboard blade section 12 are arranged adjacent to each other in the lower portion 15 of the fixture 14, as shown in FIG. 3. In the example of FIG. 3, the inboard blade section 12 is assembled from a total of ten pre-casted blade segments 8, 9, 10, five for each half shell. However, also another number of pre-casted blade segments can be applied.

In the example of FIG. 3, the first pre-casted blade segment 8 is arranged adjacent to a second pre-casted blade segment 9. Then, a further pre-casted blade segment 10 is arranged adjacent to the first pre-casted blade segment 8. Another further pre-casted blade segment 10 is arranged adjacent to the second pre-casted blade segment 9. Yet another further pre-casted blade segment 10 is arranged adjacent to the already arranged further pre-casted blade segment 10.

Figure 5:
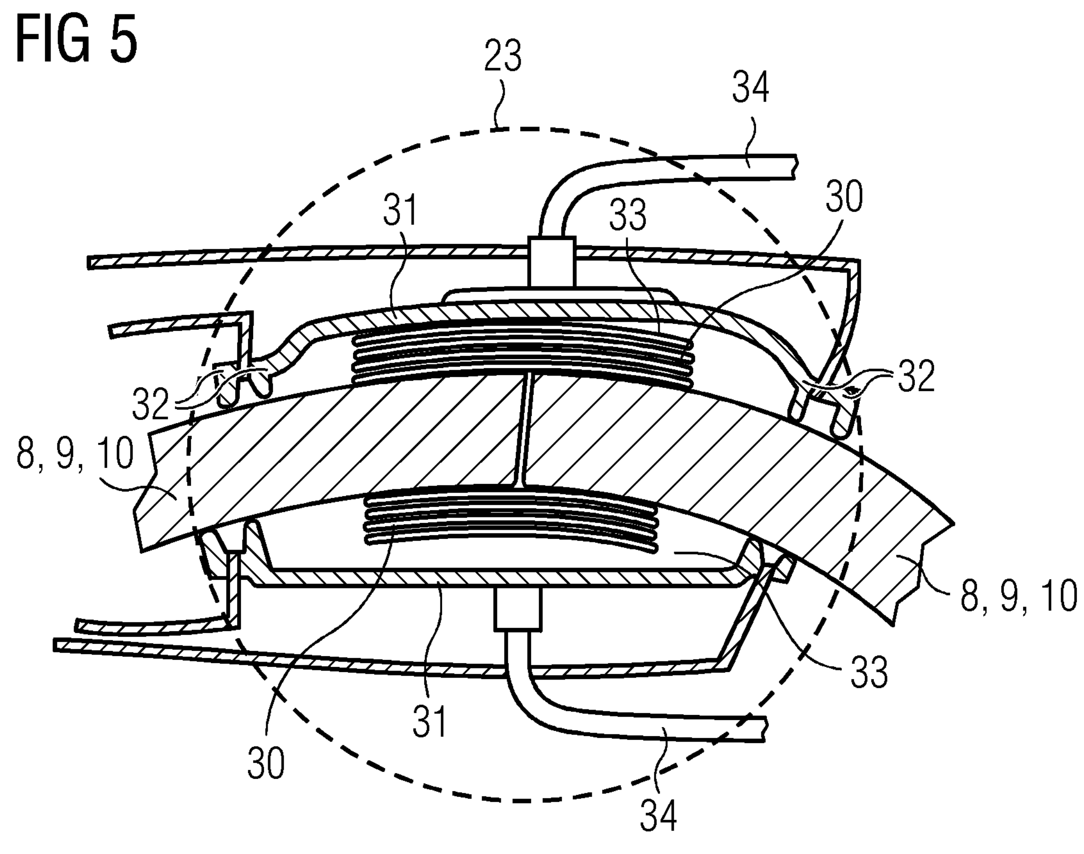
FIG. 5 shows an enlarged cross-section view of a portion V of FIG. 3.

The pre-casted blade segments 8, 9, 10 are arranged adjacent to each other such that they abut each other. FIG. 5 is an enlarged cross-section view of a portion V of FIG. 3 showing exemplarily a connection region 23 between two pre-casted blade segments 8, 9, 10.

Figure 6:
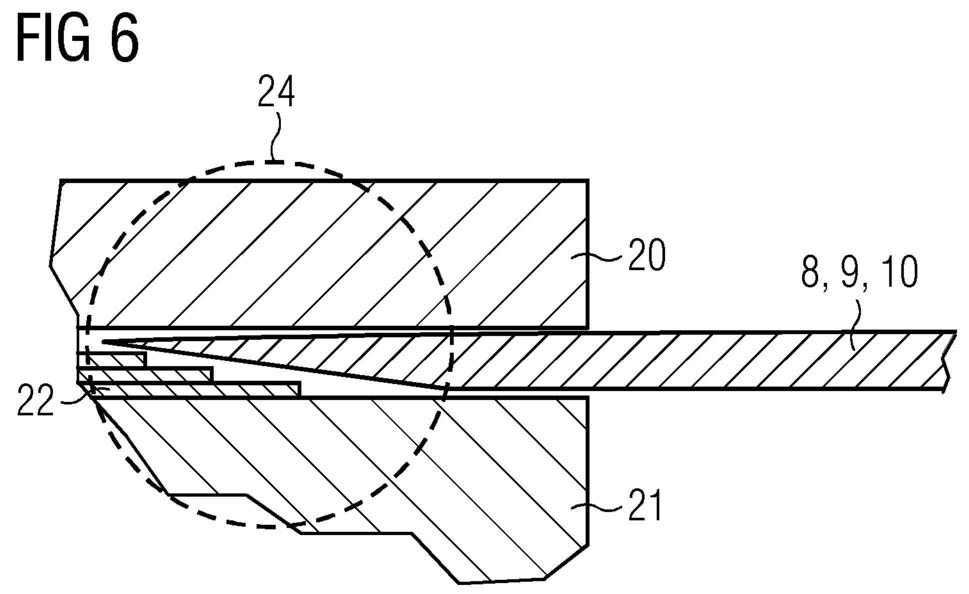
FIG. 6 shows an enlarged cross-section view of a portion VI of FIG. 3.

Furthermore, the pre-casted blade segments 8, 9, 10 are arranged in the lower portion 15 of the fixture 14 such that they overlap in an overlap region 24 with the dry fiber lay-up 22 arranged in the lower mold 19. FIG. 6 is an enlarged cross-section view of a portion VI of FIG. 3 showing exemplarily the overlap of the pre-casted blade segments 8, 9, 10 with the dry fiber lay-up 22 in the overlap region 24.

The arrangement of the pre-casted blade segments 8, 9, 10 is performed by using the fixture 14. As shown in FIG. 3, the fixture 14 comprises a rigid frame 25 such as a steel frame. Furthermore, the fixture 14 comprises actuators 26 attached to the steel frame 25. The actuators 26 are driven by mechanic, hydraulic and/or electro-mechanic means. The actuators can be, for example, controlled wirelessly, as indicated by the reference sign 27. Furthermore, there are support means 28, such as support plates, connected to the actuators 26. The support plates 28 are configured for being displaced at the outer shell of the pre-casted segments 8, 9, 10.

In FIG. 3, the steel frame 25 and the actuators 26 are only drawn for a portion of the figure for illustration purposes. Further, only some of the actuators 26 and support plates 28 are denoted with a reference sign. However, it is to be understood that every shown support plate 28 is connected to an actuator 26 which in turn is attached to the steel frame 25. Further, the steel frame 25 is covering the whole inboard blade section 12. The steel frame 25 may also cover a portion of the mold 18.

After arranging the pre-casted segments 8, 9, 10, they may be visually inspected with respect to their exact position. If a correction of their position is necessary, individual actuators 26 can be controlled to move a respective pre-casted segment 8, 9, 10.

In step S4 of the method, the mold core 21 is arranged on the dry fiber lay-up 22 in the lower mold 19, as shown in FIG. 7. In this example, the mold core comprises two mold core portions 28. Each mold core portion 28 is covered by a vacuum bag 29.

In step S5 of the method, a dry fiber lay-up 22 for an upper half shell of the outboard blade section 17 (FIG. 8) is arranged on the mold core 21 (FIG. 6, 7).

In step S6 of the method, the pre-casted blade segments 10 for the upper half shell of the inboard blade section 12 are arranged adjacent to each other in the upper portion 16 of the fixture 14.

Step S6 is performed in a similar manner as step S3. In particular, the pre-casted blade segments 10 for the upper half shell of the inboard blade section 12 are arranged adjacent to each other such that they abut each other, as shown in FIG. 5.

Furthermore, the pre-casted blade segments 10 for the upper half shell of the inboard blade section 12 are arranged in the upper portion 16 of the fixture 14 such that they overlap in the overlap region 24 with the dry fiber lay-up 22 arranged on the mold core 21, as shown in FIG. 6.

A vacuum bag (not shown) is arranged covering the circumferential overlap region 24.

Further, the upper mold 20 is arranged on the lower mold 19 such that the dry fiber lay-up 22 for the upper half shell of the outboard blade section 17 is arranged in the upper mold 20 (FIG. 3, 6).

In step S7 of the method, a fiber lay-up 30, e.g., a dry fiber lay-up 30, is arranged in each of the line-shaped connection regions 23 where one of the pre-casted blade segments 8, 9, 10 abuts another one of the pre-casted blade segments 8, 9, 10. Two of the line-shaped connection regions 23 are denoted with a reference sign in FIG. 3. Furthermore, FIG. 5 shows one of the line-shaped connection regions 23 in cross-section.

In step S8 of the method, each line-shaped connection region 23 is covered with a vacuum cover 31 such as a vacuum bag 31. In other examples, the vacuum cover 31 may also be a flexible or rigid mold. In particular, each line-shaped connection region 23 is covered with a vacuum cover, such as the vacuum bag 31, from top and from bottom, as shown in FIG. 5. In FIG. 3, two of the vacuum bags 31 applied on the outside of the pre-casted segments 8, 9, 10 are denoted with a reference sign.

The vacuum bags 31 are, for example, re-usable vacuum bags. They are, for example, made from silicone. Each vacuum bag 31 comprises, for example, two lips 32 on each side, as shown in FIG. 5.

In step S9 of the method, vacuum is applied to the edge regions between the two lips 32 of each vacuum bag 31 to generate a vacuum in this edge region. This provides a sealing of the vacuum bag 31 to the respective pre-casted segment 8, 9, 10. Then, a vacuum is applied to a space 33 covered by the vacuum bag 31.

A vacuum is also applied to a space between the vacuum bags 29 and the lower and upper molds 19, 20 (FIG. 7, cf. also FIG. 3 for the upper mold 20) and to a space covered by a vacuum bag (not shown) covering the overlap region 24 (FIG. 6).

Figure 8:
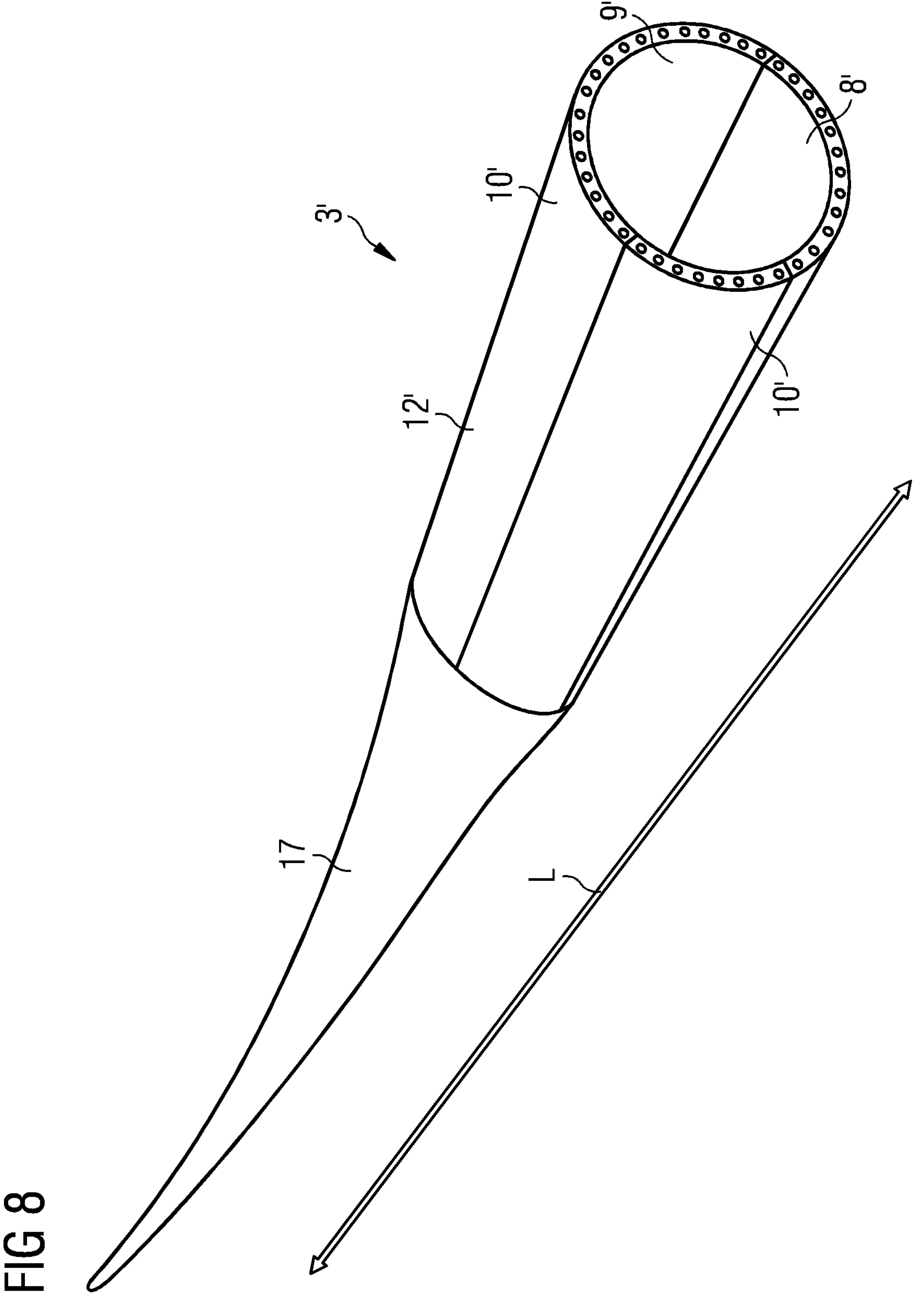
FIG. 8 shows a perspective view of a wind turbine blade manufactured by using the mold and fixture shown in FIG. 3, wherein the inboard blade section of the shown blade comprises four pre-casted blade segments.

In step S10 of the method, resin is infused through inlets 34 (FIGS. 3, 5) into the space 33 covered by the vacuum bag 31 to join the pre-casted blade segments 8, 9, 10 with each other. Further, resin is infused into the space between the vacuum bags 29 and the lower and upper molds 19, 20 (FIG. 7) to cast the outboard blade section 17 (FIG. 8). Further, resin is infused into the space covered by the vacuum bag (not shown) covering the overlap region 24 (FIG. 6) to join the outboard section 17 and the inboard section 12. The resin infusion into all these spaces can be performed simultaneously to safe time.

FIG. 8 shows a blade 3' manufactured by the described method, however, in the example of FIG. 8 only four pre-casted blade segments 8', 9', 10' are used for the inboard blade section 12'.

Figure 9:
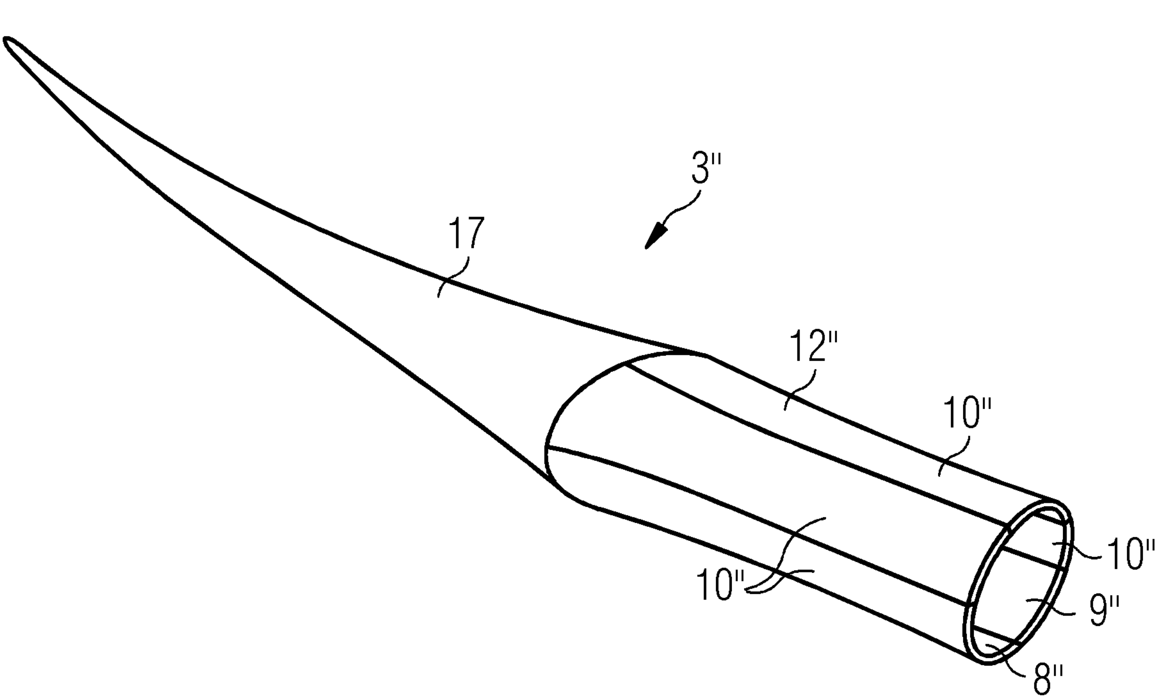
FIG. 9 shows a perspective view of another wind turbine blade manufactured by using the mold and fixture shown in FIG. 3, wherein the inboard blade section of the shown blade comprises six pre-casted blade segments.
Figure 10:
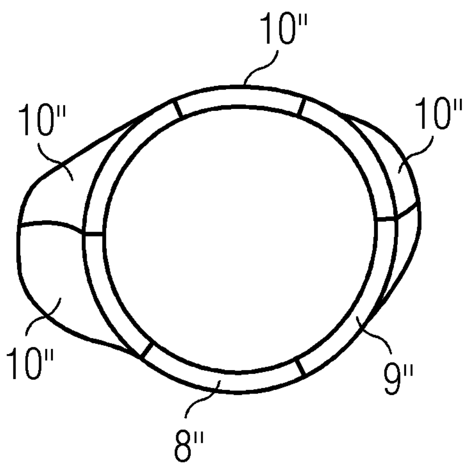
FIG. 10 shows a front view of the wind turbine blade of FIG. 9.
Figure 11:
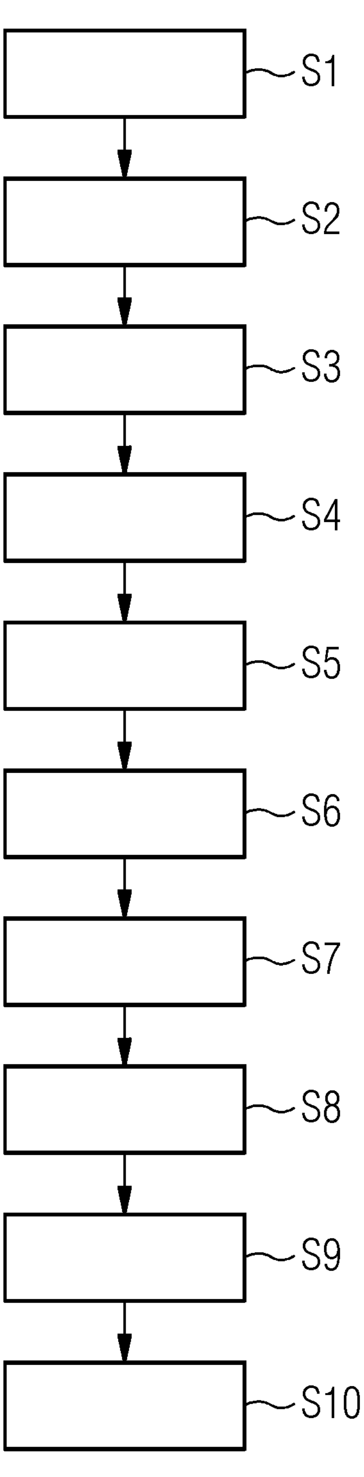
FIG. 11 shows a flowchart illustrating a method for manufacturing the wind turbine blade of FIG. 1.

FIGS. 9 and 10 show a blade 3" manufactured by the described method, however, in the example of FIGS. 9 and 10 six pre-casted blade segments 8", 9", 10" are used for the inboard blade section 12".

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for manufacturing a wind turbine blade, comprising the steps:

a) arranging a first pre-casted blade segment adjacent to a second pre-casted blade segment, b) arranging a fiber lay-up in a connection region between the first pre-casted blade segment and the second pre-casted blade segment, wherein the first pre-casted blade segment abuts the second pre-casted blade segment, wherein the connection region is a line-shaped connection region, and wherein the fiber lay-up is arranged to overlap an outer portion of the first pre-casted blade segment and an outer portion of the second pre-casted blade segment in the connection region, c) covering the connection region with a vacuum cover, d) applying vacuum to a space covered by the vacuum cover, and e) infusing the connection region with a resin, and curing the resin;

wherein, in step a), the first pre-casted blade segment is arranged adjacent to the second pre-casted blade segment in a circumferential direction of the blade and/or the line-shaped connection region is orientated along a longitudinal direction of the blade.

2. The method according to claim 1, wherein the first and second pre-casted blade segments are segments of an inboard blade section and/or of a blade root section.

3. The method according to claim 1, comprising, after one of step a) to e), the step of arranging one or more further pre-casted blade segments adjacent to the first pre-casted blade segment, the second pre-casted blade segment and/or a further pre-casted blade segment, and repeating steps b) to e) for a connection region between one of the further pre-casted blade segments and the first pre-casted blade segment, a connection region between one of the further pre-casted blade segments and the second pre-casted blade segment and/or a connection region between one of the further pre-casted blade segments and another one of the further pre-casted blade segments, wherein the first pre-casted blade segment, the second pre-casted blade segment and the one or more further pre-casted blade segments occupy an entire circumference of a lengthwise blade section.

4. The method according to claim 3, wherein step e) is carried out for all connection regions simultaneously.

5. The method according to claim 1, wherein in step a) the first pre-casted blade segment, the second pre-casted blade segment and/or one or more further pre-casted blade segments are positioned, fixed in position and/or fixed to each other.

6. The method according to claim 1, wherein in step a) the first pre-casted blade segment, the second pre-casted blade segment and/or one or more further pre-casted blade segments are fixed to each other by bolts, pins and/or an adhesive such that they are temporarily connected to each other at least in a time interval between step a) and step e).

7. The method according to claim 1, wherein:

in step a) the first pre-casted blade segment, the second pre-casted blade segment and/or one or more further pre-casted blade segments are arranged by using a fixture, the fixture has one or more actuators for positioning the first, second and/or further pre-casted blade segments, the one or more actuators are driven by mechanic, hydraulic and/or electromechanics means, and the one or more actuators are controlled wirelessly.

8. The method according to claim 7, wherein:

the fixture comprises suction means, and the first pre-casted blade segment, the second pre-casted blade segment and/or one or more of the further pre-casted blade segments are fixed in position by the suction means.

9. The method according to claim 1, wherein:

the first, the second and one or more further pre-casted blade segments are segments of an inboard blade section and/or of a blade root section, the method comprises, before, during or after step a), the step of arranging a dry fiber lay-up for an outboard blade section in a mold such that it overlaps in an overlap region with the first pre-casted blade segment, the second pre-casted blade segment and/or the one or more further pre-casted blade segments, and the dry fiber lay-up in the mold and the overlap region is infused, before, during or after step e), with resin by vacuum infusion and the resin is cured.

10. The method according to claim 1, wherein:

in step a), the first pre-casted blade segment, the second pre-casted blade segment and/or one or more further pre-casted blade segments for a lower half shell of an inboard blade section or of a blade root section are arranged adjacent to each other in a lower portion of a fixture, before, during or after step a), a dry fiber lay up for a lower half shell of an outboard blade section is arranged in a lower mold such that it overlaps in an overlap region with the first pre-casted blade segment, the second pre-casted blade segment and/or the one or more further pre-casted blade segments in the lower portion of the fixture, a mold core is arranged on the dry fiber lay-up in the lower mold, in step a), the first pre-casted blade segment, the second pre-casted blade segment and/or the one or more further pre-casted blade segments for an upper half shell of the inboard blade section are arranged adjacent to each other in an upper portion of the fixture, before, during or after step a), a dry fiber lay up for an upper half shell of the outboard blade section is arranged on the mold core such that it overlaps in an overlap region with the first pre-casted blade segment, the second pre-casted blade segment and/or the one or more further pre-casted blade segments in the upper portion of the fixture, an upper mold is arranged on the lower mold such that the dry fiber lay up for the upper half shell of the outboard blade section is arranged in the upper mold, and the dry fiber lay-up in the upper and lower molds and the overlap regions are infused, before, during or after step e), with resin by vacuum infusion and the resin is cured.

11. The method according to claim 1, comprising, before step a) the step of pre-manufacturing the first pre-casted blade segment, the second pre-casted blade segment and/or one or more further pre-casted blade segments in an open mold by vacuum infusion of a fiber lay-up with resin and curing the resin.

12. A fixture for manufacturing a wind turbine blade, the fixture being configured for arranging a first pre-casted blade segment and a second pre-casted blade segment adjacent to each other such that the first pre-casted blade segment is arranged adjacent to the second pre-casted blade segment in a circumferential direction of the blade and/or a line-shaped connection region is orientated along a longitudinal direction of the blade, the fixture also being configured for supporting the first pre-casted blade segment and the second pre-casted blade segment during their connection with each other by vacuum-induced resin infusion and curing, wherein the fixture comprises:

a rigid frame, actuators, and support plates connected to the rigid frame by the actuators, wherein the support plates are configured to dispose the first pre-casted blade segment and the second pre-casted blade segment to abut each other so as to enable arrangement of a fiber lay-up in the line-shaped connection region between the first pre-casted blade segment and the second pre-casted blade segment, wherein the fiber lay-up overlaps an outer portion of the first pre-casted blade segment and an outer portion of the second pre-casted blade segment in the connection region, and a lower fixture and an upper fixture, the lower fixture being configured for arranging the first, second and/or one or more further pre-casted blade segments for a lower half shell of an inboard blade section or blade root section, and the upper fixture being configured for arranging the first, second and/or one or more further pre-casted blade segments for an upper half shell of the inboard blade section or blade root section.

13. The fixture according to claim 12, comprising suction means for fixing the first pre-casted blade segment, the second pre-casted blade segment and/or one or more of the further pre-casted blade segments in position.

* * * * *